United States Patent [19]
Hart et al.

[11] Patent Number: 5,326,159
[45] Date of Patent: Jul. 5, 1994

[54] QUICK SERVICE LIMITING VALVE FOR FREIGHT BRAKE CONTROL VALVE DEVICE

[75] Inventors: James E. Hart, Trafford; Edward W. Gaughan, Irwin, both of Pa.

[73] Assignee: Westinghouse Air Brake Company, Wilmerding, Pa.

[21] Appl. No.: 132,261

[22] Filed: Oct. 6, 1993

[51] Int. Cl.$^5$ .............................................. B60T 17/04
[52] U.S. Cl. ...................................... 303/38; 303/33; 303/37; 303/39; 303/86
[58] Field of Search ........................ 303/33, 35, 36, 37, 303/38, 39, 40, 41, 43, 44, 81, 86, 60, 69, 72, 83

[56] References Cited
U.S. PATENT DOCUMENTS
4,819,993 4/1989 Gaughan et al. ..................... 303/38

Primary Examiner—Douglas C. Butler
Attorney, Agent, or Firm—Gary J. Falce

[57] ABSTRACT

A quick service limiting valve device for a freight brake control valve employing a primary valve in a fluid flow path via which brake pipe air is connected to the brake cylinder during a secondary phase of quick service to propagate the brake pipe reduction signal until the brake cylinder pressure acting on the limiting valve control piston effects closure of the primary valve to terminate the quick service flow of brake pipe air to the brake cylinder when a predetermined brake cylinder limit pressure is realized. A secondary valve is arranged to interrupt the brake pipe to brake cylinder flow path downstream of the primary valve in the event leakage at the primary valve causes the pressure acting on the quick service limiting valve control piston to exceed the predetermined limit pressure. Until this limit pressure is exceeded, the secondary valve is bypassed so that only the primary valve controls the brake pipe to brake cylinder flow path via the limiting valve, thereby reducing hysteresis due to friction to obtain more efficient limiting valve operation.

29 Claims, 4 Drawing Sheets

QUICK SERVICE LIMITING VALVE FOR FREIGHT BRAKE CONTROL VALVE DEVICE

BACKGROUND OF THE INVENTION

The present invention relates to railway car freight brake control valve devices and particularly to a quick service limiting valve, which provides a secondary phase of quick service brake control.

The present standard ABD and ABDW freight brake control valve devices employ a two-phase quick service function, the first phase or preliminary quick service occurring upon initial movement of the service piston from release position toward application position in response to a train line reduction of brake pipe pressure. This initial movement of the service piston establishes a communication between the car brake pipe and a quick service volume that is vented to atmosphere via a quick service exhaust choke. In this manner, a local reduction of brake pipe pressure is obtained at each car of a train to supplement the train line brake pipe reduction and accordingly encourage continued movement of the service piston to application position without hesitation.

In application position of the service piston, preliminary quick service is terminated by cutting off brake pipe pressure from the quick service volume at the service piston slide valve, and a secondary phase of quick service commences. During this secondary phase of quick service, the service piston slide valve connects brake pipe pressure to the car brake cylinder concurrently with auxiliary reservoir pressure until approximately 8-12 psi brake cylinder pressure develops. The brake pipe pressure is connected to the brake cylinder via a quick service limiting valve that is biased toward application position by a control spring.

It has been found that where relatively high pressure differentials exist between brake pipe and auxiliary reservoir during the first phase preliminary quick service, the degree of service piston movement into the service zone is such that maximum flow of the auxiliary reservoir pressure is established. Such high flow of auxiliary reservoir pressure may exceed the downstream flow capacity to the brake cylinder, consequently creating a short term back pressure surge or pulse in the brake cylinder feedback passage leading to the quick service limiting valve. Consequently, the brake cylinder pressure signal at the limiting valve control piston reaches a cut-off value of 10-12 psi prior to the actual brake cylinder pressure, which causes premature closure of the limiting valve against its control spring. When this high back pressure surge dissipates following repositioning of the service graduating valve, the quick service limiting valve is intended to quickly reapply to sustain the secondary phase quick service, it being understood that this local reduction of brake pipe pressure reinforces and hastens the initial brake pipe pressure reduction throughout the train.

The quick service limiting valve employed in the aforementioned ABD and ABDW control valves has either two or three O-ring seals on the limiting valve stem to prevent leakage of pressure from the brake pipe to the brake cylinder when the limiting valve is in its cut-off position following termination of secondary quick service. The friction of these O-rings can influence operation of the limiting valve in terms of causing operating variation and valve hysteresis, which unduly delays re-application of the limiting valve following the aforementioned premature cut-off and thereby reduces the efficiency of the quick service action in assisting the brake pipe pressure reduction.

SUMMARY OF THE INVENTION

It is the object of the present invention to provide an improved quick service limiting valve that has a more efficient secondary phase of quick service activity by achieving a low friction and, therefore, a low hysteresis operating characteristic.

It is another object of the invention to provide such a quick service limiting valve that further provides redundant protection against brake pipe to brake cylinder leakage, without significantly affecting its low friction operating characteristic.

It is a final object of the invention to provide a quick service limiting valve having a variable rate of reduction of brake pipe pressure to safely achieve a faster initial pressurization of the brake cylinder to more quickly drive the brake cylinder piston to its full stroke.

Briefly, these objectives are achieved in a quick service limiting valve device for a railway car having a brake pipe and a brake cylinder device, the quick service limiting valve device comprising a fluid flow path including a control chamber via which pressurized fluid is conducted from the brake pipe to the brake cylinder device, a control piston subject to the fluid pressure effective in the control chamber, first valve means operated in a limit zone of the control piston only in response to the control chamber fluid pressure exceeding a first predetermined value for cutting off the fluid flow path, second valve means operated in a cut-off zone of the control piston in response to the control chamber fluid pressure exceeding a second predetermined value that is greater than the first predetermined value for providing a redundant cut-off of the fluid flow path, the flow path being arranged to bypass the second valve means during such time as the control chamber fluid pressure is less than the second predetermined value.

These and other objects and advantages of the present invention will become apparent from the following more comprehensive explanation, when taken in conjunction with the accompanying drawings in which:

DESCRIPTION AND OPERATION

Figure 1:
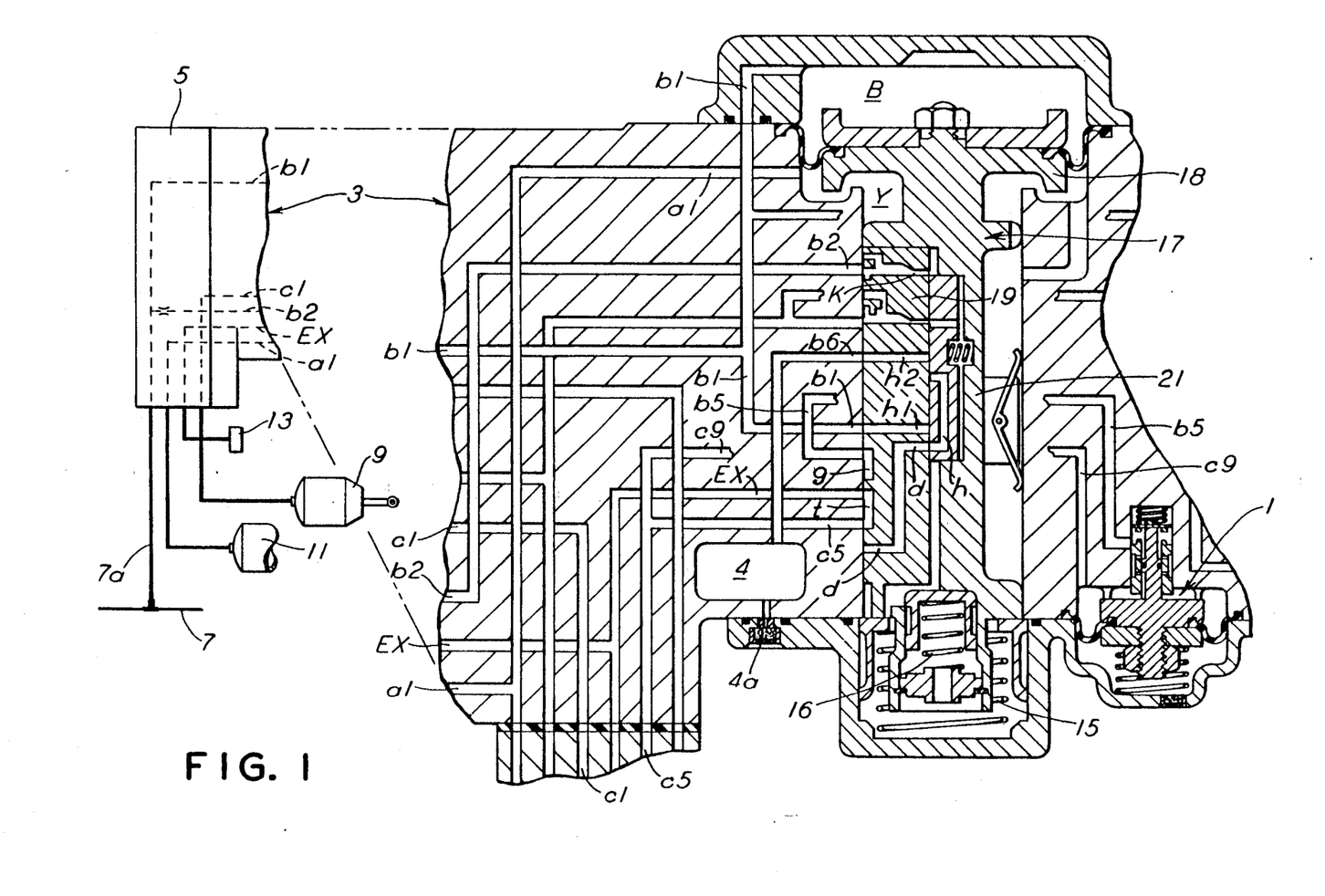
FIG. 1 is a partial diagrammatic view of a conventional ABD/ABDW type freight brake control valve service portion embodying a quick service limiting valve device in accordance with a first embodiment of the present invention.

Referring now to FIG. 1, there is shown a first embodiment of a new quick service limiting valve device 1 that is adapted to replace the present quick service limiting valve in the industry standard ABD and ABDW freight brake control valve device, the service portion 3 of which is shown mounted to the control valve pipe bracket 5.

Also connected to pipe bracket 5 is a branch pipe 7a of a brake pipe 7 that extends through each car of a train and is connected to the brake pipe of an adjacent car by flexible hose couplings (not shown), a brake cylinder device 9, an auxiliary reservoir 11, and an exhaust retainer valve 13.

Service portion 3 includes, in addition to limiting valve device 1, a quick service bulb or volume 4 and a service piston assembly 17 comprising a service piston 18 having a slide valve 19 and a graduating valve 21.

Figure 2:
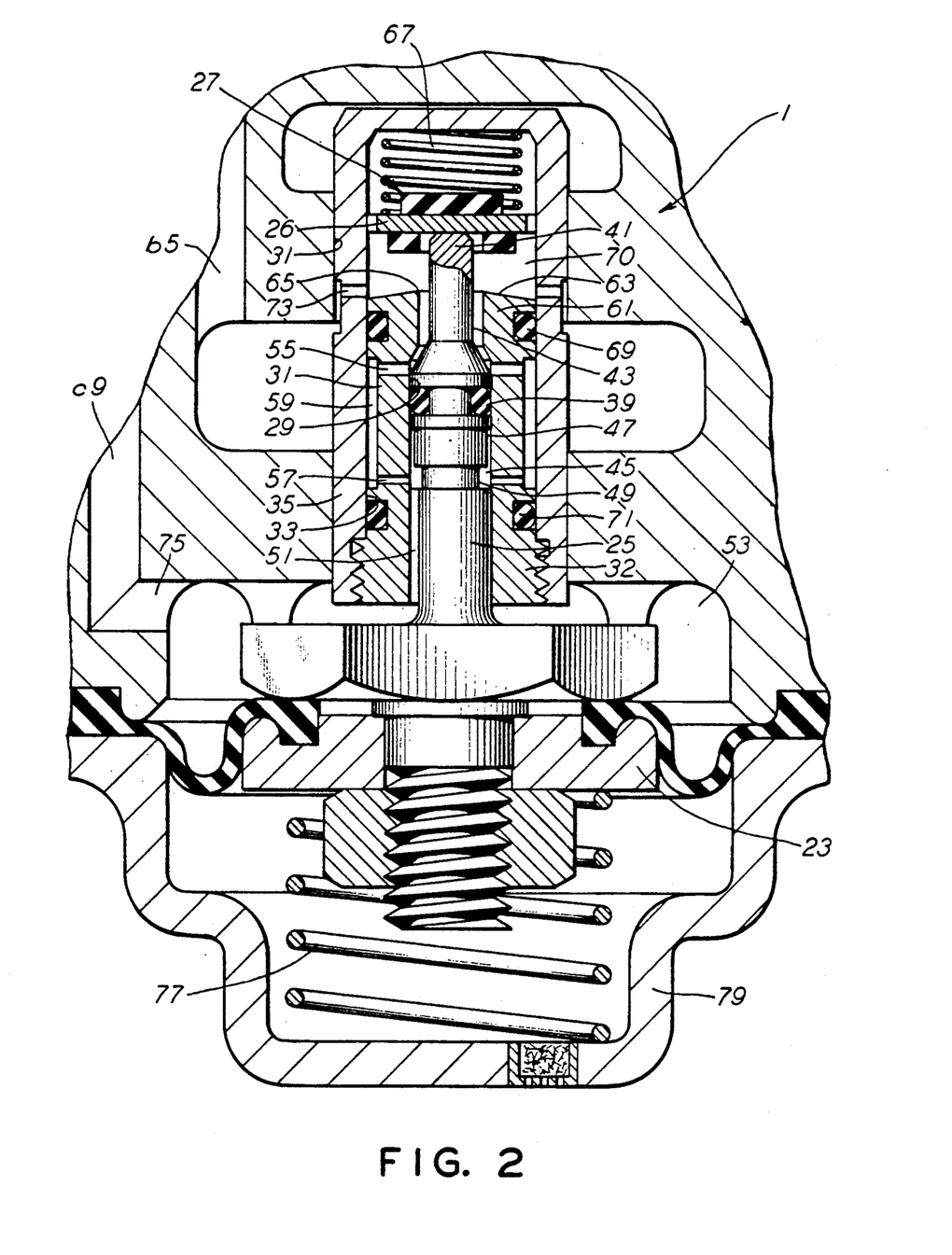
FIG. 2 is an enlarged sectional assembly view of the quick service limiting valve device of FIG. 1.

Referring to FIG. 2, limiting valve device 1 comprises a diaphragm type control piston 23 having a stem 25, the end of which is engageable with a disc valve element 26 of a poppet valve 27. The stem 25 is operably disposed in a bore 29 of a bushing 31, one end 32 of which is screw-threaded into the bore 33 of a sleeve insert 35. This sleeve insert 35 is received in a cavity 37 in which the existing ABD/ABDW control valve limiting valve device is normally housed, the sleeve insert 35 being employed to accommodate the limiting valve device 1 of the present invention without requiring any modification of the control valve body whatsoever.

Formed about the periphery of piston stem 25 between one end of an O-ring 39 thereof and the projecting end 41 of stem 25 is a first annular recess 43, another annular recess 45 being formed between O-ring 39 and piston 23. This second annular recess 45 is formed as a stepped recess having a larger diameter section 47 and a smaller diameter section 49, the smaller diameter section 49 being connected by an axial passageway 51 to a chamber 53 formed between the upper side of control piston 23 and the limiting valve cavity 37.

Bushing 31 is formed intermediate its ends with a plurality of upstream connecting passages 55 and a plurality of downstream connecting passages 57 that are spaced-apart axially from connecting passages 55. These connecting passages 55, 57 extend radially between an annular recess 59 in the periphery of bushing 31 and the bushing bore 29, which together form a bypass passageway 55, 57, 59. The flow capacity of the radial downstream connecting passages 57 limits the maximum flow of brake pipe air to brake cylinder 9 via this bypass passageway 55, 57, 59. The end of bushing 31 opposite its screw-threaded end 32 is formed with an inclined surface 63 that terminates in a valve seat 65 with which valve element 27 is engageable under the influence of a spring 67. An O-ring 69 in bushing 31 between a chamber 70 and radial connecting passages 55 provides a pressure seal with bore 33 of bushing 35, as does an O-ring 71 in bushing 31 between chamber 53 at bushing end 32 and passages 57.

An inlet port 73 in bushing 35 is connected between a passage b5 (FIG. 1) leading from brake pipe 7 to cavity 37 and chamber 70, while cavity 37 is connected to brake cylinder device 9 via chamber 53 and a branch passage c9 of passage c5. A control spring 77 acts between the underside of control piston 23 and a bottom cover 79, this spring being selected to exert such force on control piston 23 as to maintain the piston in its application position, as shown, until a predetermined counteracting pressure of approximately 8–12 psi is established in chamber 53. In this application position of control piston 23, valve element 26 is disengaged from its seat 65 by stem 41 and O-ring 39 is positioned axially intermediate ports 55 and 57, with annular recess 43 of stem 25 being communicated with upstream radial passages 55 and the smaller diameter section 49 of stepped annular recess 45 being aligned opposite downstream radial passages 57. As will hereinafter be explained, this stepped recess 45, comprising the larger and smaller diameter sections 47, 49, provides for a two-stage buildup of brake cylinder pressure during the secondary phase of quick service.

The operation of the quick service limiting valve device 1 will now be explained in terms of providing an improved secondary phase of quick service in conjunction with the usual preliminary phase of quick service obtained through the service piston assembly 17.

In release position of the control valve service portion 3, as shown in FIG. 1, compressed air carried in the train brake pipe 7 is connected via branch pipe 7a and passage b1 to chamber B on the face of the control valve service piston 18 and via passage h1 in service slide valve 19 to the seat of graduating valve 21 where it is blanked. The brake pipe air is also connected via a charging choke and passage b2 to the seat of slide valve 19 where a choked orifice k in the slide valve controls the flow of air to a chamber Y on the underside of piston 18. A passage a1 connects this air from chamber Y to the auxiliary reservoir 11, which is thus charged to the pressure carried in brake pipe 7. With chambers B and Y on opposite sides of piston 18 charged to the same pressure, a spring 15 is effective to position piston 18, as shown. In this release position, brake cylinder device 9 is vented to atmosphere via passages c1 and c5, which are interconnected through valving in the brake cylinder release portion (not shown), slide valve port t, passage c1, exhaust passage EX, and retainer valve 13. A branch passage c9 of passage c5 also vents control chamber 53 of limiting valve 1.

With the control valve service portion 3 thus charged, as explained, a minimum service application of the brakes may be initiated by reducing the brake pipe pressure at a controlled service rate via the engineer's brake valve device (not shown).

In response to such reduction of brake pipe pressure, a pressure differential is created across piston 18 due to the pressure in chamber B above piston 18 being reduced with brake pipe pressure via passage b1, while at the same time, the auxiliary reservoir charging choke in passage b2 prevents the pressure in chamber Y below piston 18 from reducing at the same rate. Piston 18 is thus deflected upwardly from its shown release position toward application position, carrying graduating valve 21 along.

The stabilizing spring guide 14 engages the end of the service slide valve 19 so that further movement of the diaphragm piston and graduating valve 21 toward service position compresses the stabilizing spring 16. As its name indicates, the stabilizing spring offers a predetermined resistance to diaphragm piston and graduating valve movement so that undesired quick service applications will not be caused by small fluctuations in brake pipe pressure. During this initial diaphragm piston displacement, the service graduating valve 21 blanks port k in the slide valve, cutting off chamber Y and auxiliary reservoir from brake pipe charging passage b2. It also uncovers port d in the slide valve, connecting auxiliary reservoir air to the slide valve seat. After the stabilizing spring is compressed, cavity h in the graduating valve connects ports h1 and h2 through the slide valve, permitting brake pipe air to flow from passage b1 to passage b6 and the quick service volume 4. This produces a local reduction of brake pipe pressure by directing brake pipe air to the quick service volume. This preliminary quick service reduction of brake pipe pressure is transmitted serially in rapid wave action from car to car until sufficient differential pressure force is developed across the service piston 18 on each car to move slide valve 19 with it to service application position, thus assuring that even a light brake application will carry quickly through the train.

As piston 18 moves toward application position, passage h2 in slide valve 19 is moved out of registry with passage b6, thereby cutting off flow of brake pipe air to the quick service volume and accordingly terminating the preliminary phase of quick service activity. The quick service volume pressure is subsequently dissipated to atmosphere through the quick service volume exhaust choke 4a.

In service position, passage d in slide valve 19 registers with passage c5 at the slide valve seat, connecting auxiliary reservoir air to brake cylinder device 9 via passages c5 and c1. At the same time, slide valve port g connects passage b1 with passage b5 leading to quick service limiting valve device 1. This initiates the first stage of secondary quick service.

In this first stage of secondary quick service in which the limiting valve control piston 23 is held in its application position by spring 77, valve element 27 is unseated by piston stem 25, and seal ring 39 is engaged with bore 29 between axially spaced, radial connecting passages 55, 57. Consequently, a flow path comprising inlet port 73, open poppet valve 27, stem recess 43, bypass passage 55, 57, 59, stem recess 45, passageway 51 in stem 25, control chamber 53, outlet port 75, and branch passage c9 of brake cylinder passage c5 is established via which brake pipe pressure at passage b5 is connected to brake cylinder device 9 concurrently with pressurized air from auxiliary reservoir 11. In that the smaller diameter section 49 of recess 45 is aligned with radial connecting passages 57, in application position and during initial deflection of piston 23, full flow capacity of the aforementioned flow path is initially realized during this first stage of secondary quick service. In addition to supplementing the supply of auxiliary reservoir air to the brake cylinder to provide a fast buildup of the brake cylinder pressure, this additional supply of brake pipe pressure to the brake cylinder provides a local quick service reduction of brake pipe pressure to propagate the brake pipe reduction through the train.

As the brake cylinder pressure builds up in control chamber 53 to approximately 5-6 psi, control piston 23 is deflected in a downward direction until the larger diameter section 47 of recess 45 is located adjacent radial connecting passages 57, the annular flow area of recess 45 at this larger diameter section 47 being less than the flow area of the radial connecting passages 57 so as to provide a flow restriction in the aforementioned limiting valve flow path. This terminates the first stage of secondary quick service and initiates a second stage during which the brake pipe pressure is reduced at a slower rate, as compared to the full capacity rate during the first stage. This two-stage, quick service reduction of brake pipe pressure takes place during operation of control piston 23 through an application zone of travel. In providing this secondary quick service function as a two-stage operation, improved control of the brake pipe pressure throughout a train of cars equipped with the quick service limiting valve of the present invention can be obtained, while also preventing undesired release of the brakes on the rear end cars.

When the brake cylinder pressure effective in control chamber 53 builds up to approximately 8-10 psi, control piston 23 is deflected from its application zone to a limit zone in which spring 67 is effective to seat poppet valve element 26, thereby cutting off further supply of brake pipe air from passage b5 to the brake cylinder via the limiting valve flow path.

In the case where the pressure buildup in control chamber 53 is significantly ahead of the actual brake cylinder pressure, the limiting valve control piston may be prematurely deflected into the aforementioned limit zone, but upon subsequent dissipation of control chamber pressure, as the pressure gradient in the brake cylinder line tends to balance out, spring 77 is effective to very quickly force the control piston back into the application zone in which poppet valve element 27 is unseated and the connection of brake pipe air to the brake cylinder is re-established. In that only a single O-ring seal 39 is employed in the limiting valve of the present invention, it will be appreciated that minimal friction exists between the piston stem 2 and bore 29 so that limiting valve 1 is subject to low hysteresis, as compared to the present standard limiting valve having two or three seal rings and thus higher sliding friction and hysteresis. Consequently, the efficiency of limiting valve device 1 is improved by reason of its ability to re-apply more quickly following dissipation of control chamber pressure to a value below the aforementioned closing pressure.

When the brake cylinder pressure effective in control chamber 53 finally settles out at a value of approximately 8-10 psi, the position of control piston 23 is stabilized in its limit zone in which poppet valve 27 is closed by its spring 67 to thereby terminate the second stage of secondary quick service. In this limit zone, piston stem end 41 is retracted from poppet valve element 26, and the axial position of seal ring 39 remains above the radial downstream connecting passages 57, so that the limiting valve flow path remains intact except for the fact that poppet valve 27 is closed.

It will now be further appreciated that in the event poppet valve 27 should leak, the brake cylinder pressure will gradually buildup via the quick service limiting valve 1, due to this leakage, even though the car control valve service portion 3 assumes a proper lap position in which auxiliary reservoir pressure is cut off to the brake cylinder 9. When this leakage pressure effective in control chamber 53 builds up to a value exceeding the limit value of 8-10 psi, as for example 13-17 psi, control piston 23 is deflected beyond its limit zone against the force of spring 77 into a cut-off zone in which seal ring 39 is shifted to the other side of radial downstream connecting passages 57. In this cut-off zone of control piston 23, the limiting valve flow path is interrupted by seal ring 39, which serves as a backup or redundant pressure seal to more positively limit and prevent undesired leakage of brake pipe pressure past poppet valve 27 to brake cylinder In the absence of such leakage past poppet valve 27, it will be understood that seal ring 39 does not cross any ports, unless a further brake pipe pressure reduction, exceeding a minimum reduction, is made at the locomotive brake valve.

Figure 3:
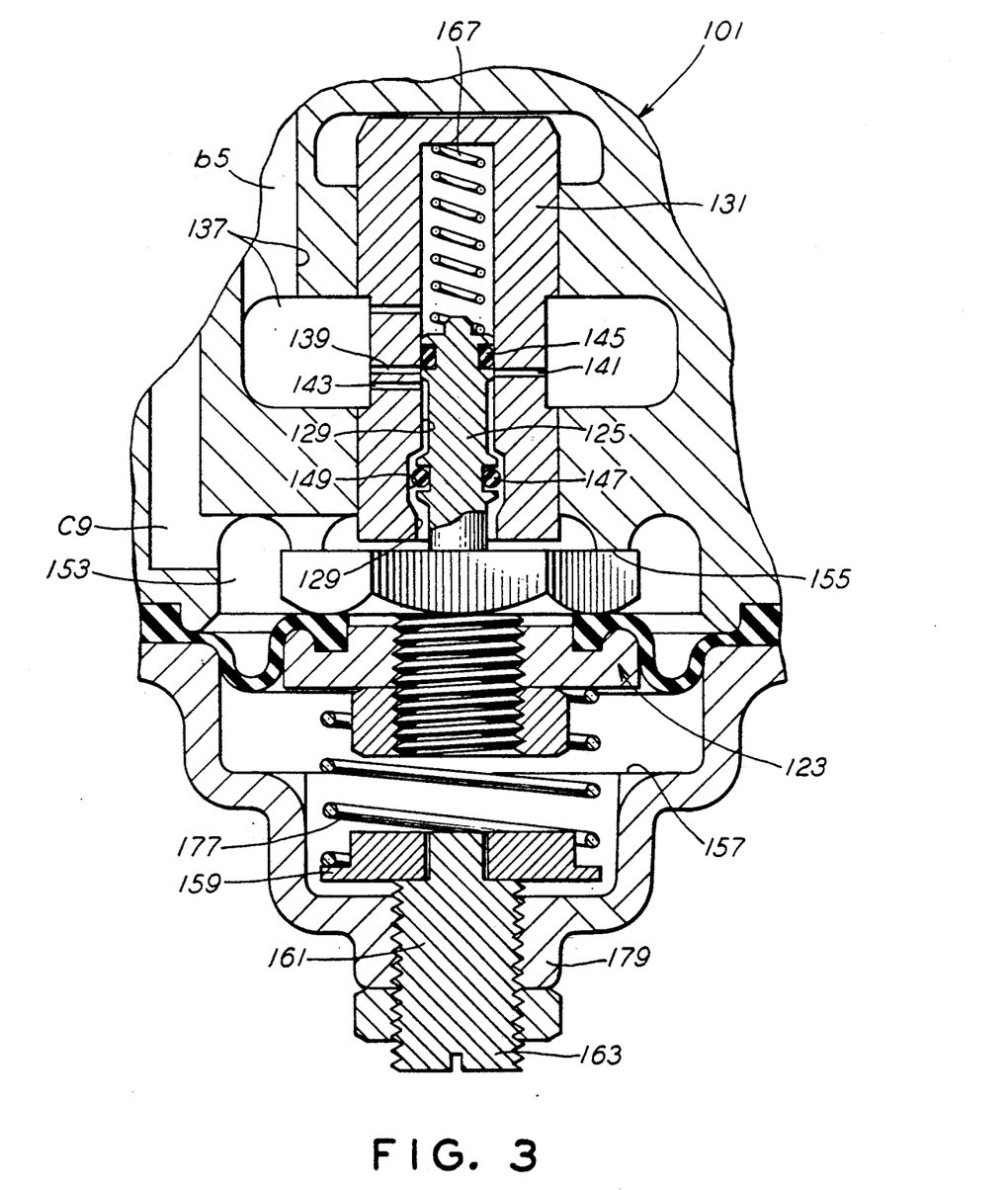
FIG. 3 is an enlarged sectional assembly view of an alternate embodiment of the quick service limiting valve of the present invention.

In accordance with a second embodiment of the invention, a quick service limiting valve device 101, as shown in FIG. 3, comprises a diaphragm type control piston 123, a bushing 131 that is press fit in a cavity 137 in which the existing ABD/ABDW control valve limiting valve device is normally housed, and a spool member 125 that is operably disposed in a bore 129 of bushing 131. A spring 167 acts on spool member 125 in a direction to establish and maintain engagement of spool member 125 with piston 123. Bore 129 is open at one end to a control chamber 153 formed on the upper-side of piston 123, the control chamber being connected by passage c9 to brake cylinder device 9. Passage b5 leading to cavity 137 is connected to bore 129 via a plurality of axially-spaced, radial connecting passages 139, 141 and 143.

Spool member 125 includes a pair of axially spaced O-ring seals 145 and 147 that are adapted to engage bore 129. In the upper-most position of control piston 123 in its application zone, as shown, spool member 125 is positioned so that O-ring seals 145 and 147 are located on opposite sides of the plurality of connecting passages 139, 141, and 143. Bore 129 is formed with a recess 149, which in this position of spool member 125, provides a bypass around O-ring seal 147. The axial dimension of recess 149 is such that O-ring seal 147 only engages bore 129 in the lower-most range of travel of spool member 125 corresponding to a cut-off zone of operation of control piston 123. Within the application zone and a limit zone intermediate application and cut-off zones, O-ring seal 147 lies within the range of recess 149, thereby establishing a flow path between brake pipe passage b5 and brake cylinder passage c9. The capacity of this flow path is varied according to the axial position of O-ring 145 relative to the plurality of passages 139, 141 and 143, as hereinafter explained.

In the upper-most position, piston 123 rests against a stop 155 under the influence of a spring 177, while another stop 157 establishes the lower-most position of piston 123. Spring 177 bears against the underside of piston 123 and a shoulder washer 159 that is carried on a spring guide pin 161. This guide pin 161 has screw-threaded engagement with a bottom cover 179, from which an extension 163 projects externally to accommodate a tool to turn the guide pin and thereby adjust the caged spring height and spring load.

As previously explained relative to the embodiment of FIG. 2, port g of slide valve 19 connects passage b1 to passage b5 leading to quick service limiting valve device 1 to initiate the first stage of secondary quick service. With spool member 25 initially located as shown in its uppermost position as controlled by piston 123 under the influence of spring 177, brake pipe pressure is connected to brake cylinder device 9 via the plurality of connecting passages 139, 141 and 143, bore 129, including bypass recess 149, and chamber 153. In that all of the connecting passages 139, 141 and 143 are open by virtue of O-ring seal 139, being axially positioned above these passages, full capacity flow is initially established during this first stage of secondary quick service. In thus supplying brake pipe pressure to the brake cylinder, not only is the buildup of brake cylinder pressure hastened, but a local reduction of brake pipe pressure is also realized to cause auxiliary reservoir air to also flow into the brake cylinder at a hastened rate through the service slide valve.

As the pressure in control chamber 153 builds up with brake cylinder pressure, piston 123 is deflected in a downward direction in the application zone, and spring 167 forces spool member 125 to follow piston 123. This movement of spool member 125 causes O-ring seal 145 to progressively slide over connecting passages 139, 141 and 143, thereby cutting off each in succession and gradually reducing the amount of brake pipe air flowing to brake cylinder device 9, as the brake cylinder pressure builds up. When the brake cylinder pressure effective in control chamber 153 has reached approximately 8-10 psi, control piston 123 is deflected out of the application zone into the limit zone in which the deflection of spool member 25 is such that O-ring seal 145 is completely shifted over connecting passages 139, 141 and 143 to interrupt further feed of brake pipe pressure to the brake cylinder via the quick service limiting valve device.

If the brake application is in response to a minimum service reduction, spring 177 can force control piston 12 and thus spool member 125 back into application zone, reopening at least application port 143, thereby re-establishing communication between brake pipe passage b5 and brake cylinder passage c9. During this stage of operation only the friction of a single O-ring seal 145 resists movement of spool 125 and accordingly influences the valve operation, such operation therefore exhibiting very low frictional hysteresis and accordingly improved efficiency.

Moreover, the plurality of connecting passages 139, 141 and 143 supplying brake pipe pressure to brake cylinder device 9 provide a gradual reduction of the secondary quick service activity, thereby controlling the rate and degree of brake pipe reduction and avoiding undesired release of the brakes on the rear end cars of a train particularly during minimum service brake applications.

As the brake cylinder pressure effective in control chamber 153 levels out at approximately 8 to 10 psi, the secondary quick service function is terminated. At approximately 13–17 psi, control piston 123 is forced into its cut-off zone. Since spool member 125 is forced by spring 167 to follow piston 123, O-ring seal 147 is forced beyond the confines of recess 149 such as to engage bore 129. This provides a redundant or backup pressure seal to O-ring seal 145 in order to more positively isolate brake pipe pressure from brake cylinder device 9 and accordingly prevent undesired "leak-up" of brake cylinder pressure.

Control spring 177 may be adjusted by rotating guide pin 161 at its external extension 163 in order to exert a specific force on control piston 123, thereby "fine tuning" the quick service valve to achieve a precise brake cylinder pressure cut off point.

Figure 4:
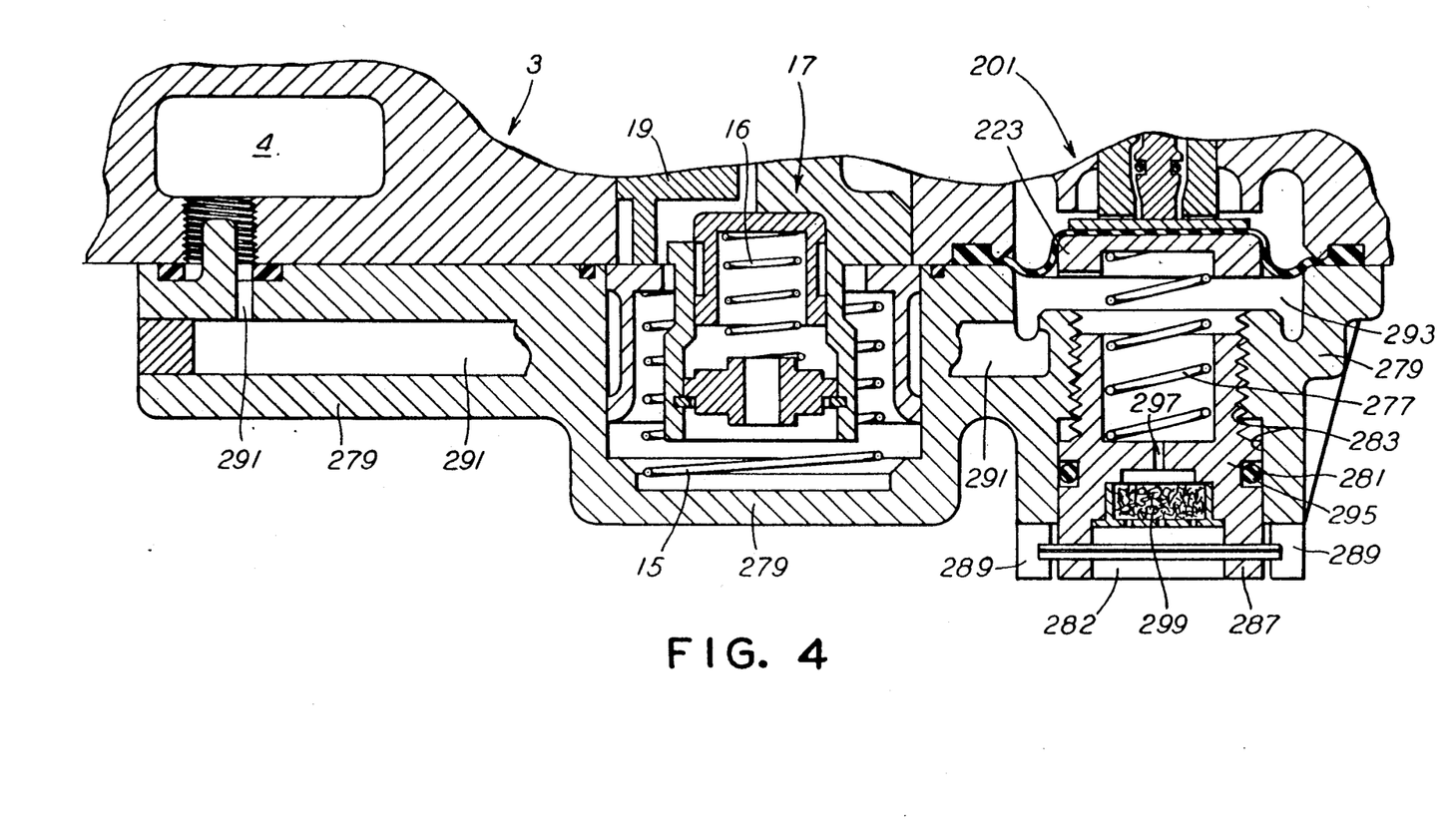
FIG. 4 is a sectional assembly view of a further embodiment of the invention showing a different control piston adjusting arrangement that may be employed with the embodiment of either FIG. 2 or FIG. 3 and a modified bottom cover arranged to incorporate the features of U.S. Pat. No. 4,819,993.

The limiting valve device 201 shown in the embodiment of FIG. 4, is similar to that of FIG. 3, except for a bottom cover 279 that is arranged to house an adjustable spring cage 281 and to conduct pressure to the underside of the limiting valve control piston 123. Spring cage 281 is adjustably positioned in a stepped bore 283 of cover 279 by threaded engagement therewith. The limiting valve control spring 277 is carried between the spring cage and the limiting valve control piston 223 to bias the control piston toward its uppermost position. The bottom surface of spring cage 281 projects from bore 283 and is formed with a recess 282 that is adapted to receive a hex-shaped tool for rotating the spring cage to change its axial position by reason of its threaded connection with bore 283, thereby adjusting the force exerted by control spring 277 on control piston 223. The spring adjustment is locked in by means of a roll pin 287 that is pressed laterally into spring cage 281 so that the ends of the roll pin project into 180 degree opposed openings 289 of a plurality of equally spaced openings formed in a denticulated portion of bottom cover 279 surrounding bore 283.

Cover 279 is further arranged with a passage 291 via which quick service pressure is conducted from bulb 4 in the ABD/ABDW control valve service portion 3 to a suppression chamber 293 formed in cover 279 between control piston 223 and spring cage 281. An O-ring 295 surrounds the periphery of spring cage 281 to provide a pressure seal with the unthreaded portion of stepped bore 283. A pressure restrictor 297 in spring cage 281 vents chamber 293 via a wasp excluder 299 that is secured, as by a press fit, into the base of recess 282.

In addition to housing a spring-adjusting mechanism for setting the precise pressure at which the limiting valve device 1 operates to terminate the secondary stage of quick service, the bottom cover 279 is designed to incorporate a desirable function taught in U.S. Pat. No 4,819,993, whereby the pressure developed in bulb 4 during preliminary quick service is connected to suppression chamber 293, from where it is exhausted via pressure restrictor 297 and wasp excluder 299. This exhaust restriction causes a pressure buildup in chamber 293 below control piston 223 during the preliminary stage of quick service, due to pressurization of quick service bulb 4, to provide a momentary air load on piston 293 in a direction to support the bias provided by spring 277. This tends to maintain control piston 223 in its application position during a limited, critical time when a sudden, high influx of pressure to the brake cylinder causes false back pressure to develop in chamber 53 above control piston 223. As discussed under "Background of the Invention", this false back pressure tends to momentarily deflect piston 223 and thereby prematurely interrupt the secondary quick service activity.

It will be appreciated that in pressurizing chamber 293, premature actuation of control piston 223, due to the aforementioned false pressure buildup in chamber 253, is suppressed, not withstanding the fact that limiting valve device 201 is capable of low hysteresis operation in the manner explained relative to the embodiment of FIG. 3, in order to obtain a more efficient secondary quick service function, in the event such premature actuation of the quick service limiting valve control piston should still occur.

What is claimed is:

1. For a railway car equipped with a fluid pressurized brake pipe and a fluid pressure operated brake cylinder device, a quick service limiting valve device comprising:
   (a) a control piston having an application zone, a cut-off zone, and a limit zone intermediate said application and cut-off zones;
   (b) fluid flow path means for conducting fluid under pressure from said brake pipe to said brake cylinder device in said application zone of said control piston;
   (c) a control chamber in said fluid flow path means in which said control piston is operably disposed so as to be subject to the fluid pressure effective in said control chamber;
   (d) first valve means for interrupting said fluid flow path means when said control piston is in said limit zone in accordance with the fluid pressure effective in said control chamber exceeding a first predetermined value;
   (e) second valve means for providing a redundant cut-off of said fluid flow path means with said first valve means when said control piston is in said cut-off zone in accordance with the fluid pressure in said control chamber exceeding a second predetermined pressure greater than said first predetermined pressure; and
   (f) said fluid flow path means including means for bypassing said second valve means when said control piston is in said application and limit zones in accordance with the fluid pressure in said control chamber being less than said second predetermined pressure.

2. A quick service limiting valve device as recited in claim 1, wherein said first valve means comprises a poppet type valve.

3. A quick service limiting valve device as recited in claim 1, wherein said fluid flow path means comprises a bore opening at one end thereof into said control chamber and said bypass means comprises a passage the ends of which open into said bore at axially spaced locations.

4. A quick service limiting valve device as recited in claim 3, wherein said first valve means comprises:
   (a) a stem projecting from said control piston, a portion of said stem being operatively disposed in said bore;
   (b) said bore terminating in a valve seat at the end thereof opposite said one end;
   (c) a disc valve element disengagable from said seat by said stem when said control piston is in an application zone in accordance with the fluid pressure in said control chamber being less than said first predetermined value; and
   (d) spring means for seating said valve element in response to said movement of said control piston from said application zone to a limit zone in accordance with the fluid pressure in said control chamber exceeding said first predetermined pressure.

5. A quick service limiting valve device as recited in claim 4, wherein said second valve means comprises a seal ring surrounding said stem and engaging said bore intermediate said ends of said passage in the range of travel of said control piston between said application and limit zones, said seal ring engaging said bore to seal said fluid flow path means intermediate said control chamber and said ends of said passage in said cut-off zone.

6. A quick service limiting valve device as recited in claim 5, further comprising means for varying the rate of flow of fluid under pressure via said passage in a range of travel of said control piston in said application zone.

7. A quick service limiting valve device as recited in claim 6, whereby said varying means comprises the periphery of said stem having at least two different diameters between said seal ring and said control piston.

8. A quick service limiting valve device as recited in claim 7, wherein the smaller of said at least two different diameters is aligned with a first end of said passage in said application zone of said control piston and the larger of said at least two different diameters is aligned with said first end of said passage in said application zone as said control piston moves toward said limit zone.

9. A quick service limiting valve device as recited in claim 1, wherein said first valve means comprises a spool type valve.

10. A quick service limiting valve device as recited in claim 1, further comprising:

(a) a control spring acting on said control piston in a direction in opposition to the fluid pressure effective in said control chamber; and (b) means for manually adjusting the tension of said control spring.

11. A quick service valve device as recited in claim 3, further comprising means for varying the rate of flow of fluid under pressure via said passage in a range of travel of said control piston in said application zone.

12. A quick service limiting valve device as recited in claim 11, wherein said varying means comprises port means for providing fluid pressure communication between said brake pipe and said bore.

13. A quick service limiting valve device as recited in claim 12, wherein said first valve means comprises:

(a) a spool member operatively disposed in said bore, one end of said spool member engaging said control piston; and (b) a first seal ring encircling the periphery of said spool member, said first seal ring engaging said bore at a location on the side of said port means opposite said control chamber when said control piston is in said application zone and said first seal ring engaging said bore at a location between said port means and said one end of said bore when said control piston is in said limit and cut-off zones.

14. A quick service limiting valve device as recited in claim 13, further comprising spring means for biasing said spool member toward said engagement thereof with said control piston.

15. A quick service limiting valve device as recited in claim 13, wherein said port means comprises a plurality of axially spaced ports.

16. A quick service limiting valve device as recited in claim 15, wherein at least two of said plurality of axially spaced ports overlap.

17. A quick service limiting valve device as recited in claim 15, wherein:

(a) said passage is a recess in said bore between said port means and said one end of said bore; and (b) said second valve means is a second seal ring encircling said spool member, said second seal ring lying generally adjacent said recess, said second seal ring engaging said bore only in said cut-off zone.

18. A quick service limiting valve device as recited in claim 17, wherein the side of said recess adjacent said one end of said bore is tapered.

19. A quick service limiting valve device as recited in claim 17, wherein the minimum axial dimension of said recess is greater than the maximum axial dimension between said plurality of axially spaced ports.

20. A quick service limiting valve device as recited in claim 1, further comprising means for momentarily pressurizing one side of said control piston.

21. A quick service limiting valve device as recited in claim 20, wherein said pressurizing means comprises:

(a) a suppression chamber with which said one side of said control piston is communicated;

(b) a quick service volume subject to fluid under pressure at a time prior to said fluid flow path means conducting fluid under pressure from said brake pipe to said brake cylinder device;

(c) passage means for communicating said suppression chamber with said quick service volume; and (d) choke means for exhausting fluid under from said suppression chamber, whereby said one side of said control piston is only momentarily pressurized.

22. A quick service limiting valve device as recited in claim 1, wherein:

(a) said fluid flow path means includes a bore opening at one end thereof into said control chamber;

(b) said bypass means includes a recess in said bore between said port means and said one end of said bore; and (c) said second valve means includes a spool member having a seal ring encircling the periphery thereof, said seal ring lying adjacent said recess in said application and limit zones and engaging said bore in said cut-off zone.

23. A quick service limiting valve device as recited in claim 22, wherein at least one side of said recess is tapered.

24. A quick service limiting valve device as recited in claim 3, wherein said second valve means includes a spool member having a seal ring encircling the periphery thereof, said seal ring engaging said bore intermediate said ends of said passage in the range of travel of said control piston within said application and limit zones, and engaging said bore to seal said flow path means intermediate said control chamber and the lower one of said ends of said passage in said cut-off zone of said control piston.

25. A quick service limiting valve device as recited in claim 1, wherein said first valve means comprises:

(a) said flow path means including a bore having one end opening into said control chamber;

(b) port means for providing fluid pressure communication between said brake pipe and said bore; and (c) said first valve means including a spool member operatively disposed in said bore, said spool member having a seal ring encircling the periphery thereof and engaging said bore at a location axially displaced on one side of said port means in said application zone of said control piston and engaging said bore at a location axially displaced on the other side of said port means in said limit zone of said control piston.

26. A quick service limiting valve device as recited in claim 25, wherein sai flow rate varying means comprises:

(a) said port means comprising a plurality of axially spaced ports; and (b) said seal ring engaging said bore on said one side of said port means in one extreme position of said control piston within said application zone and engaging said bore intermediate different ones of said plurality of ports in response to movement of said control piston from said one extreme position in said application zone toward said limit zone.

27. For a railway car equipped with a fluid pressurized brake pipe and a fluid pressure operated brake cylinder device, a quick service limiting valve device comprising:

(a) a control piston having an application zone, a cut-off zone, and a limit zone intermediate said application and cut-off zones;

(b) fluid flow path means for conducting fluid under pressure from said brake pipe to said brake cylinder device in said application zone of said control piston;

(c) a control chamber in said fluid flow path means in which said control piston is operably disposed so as to be subject to the fluid pressure effective in said control chamber;

(d) first valve means for interrupting said fluid flow path means when said control piston is in said limit zone in accordance with the fluid pressure effective in said control chamber exceeding a first predetermined value;

(e) means for varying the rate of flow of fluid under pressure conducted from said brake pipe to said brake cylinder device via said fluid flow path means prior to said first valve means interrupting said fluid flow path means in response to movement of said control piston from said application zone toward said limit zone, as the fluid pressure effective in said control chamber increases.

28. A quick service limiting valve device as recited in claim 27, wherein said flow rate vary means comprises:

(a) said flow path means including a bore having one end opening into said control chamber and the other end communicated with said brake pipe fluid under pressure;

(b) a bypass passage having the ends thereof open into said bore at axially spaced locations; and (c) a spool member operatively disposed in said bore for movement with said control piston, said spool member having at least two different diameters, a smaller one of said at least two diameters being disposed adjacent one of said ends of said bypass passage in one extreme position of said control piston in said application zone and a larger one of said at least two diameters being disposed adjacent said one end of said bypass passage in the other extreme-position of said control piston in said application zone.

29. A quick service limiting valve device as recited in claim 28, wherein said first valve means comprises:

(a) a valve seat formed at said other end of said bore;
(b) a valve element engageable with said valve seat; and
(c) a stem projecting from said spool member for engagement with said valve element.

* * * * *